(12) United States Patent
Meunier et al.

(10) Patent No.: US 6,820,815 B2
(45) Date of Patent: *Nov. 23, 2004

(54) ENCODED SHEET MATERIAL

(75) Inventors: Jean-Luc Meunier, Saint Nazaire les Eymes (FR); Marc Dymetman, Grenoble (FR); Christer Fernstrom, St-Ismier (FR)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/371,752

(22) Filed: Feb. 21, 2003

(65) Prior Publication Data

US 2003/0127523 A1 Jul. 10, 2003

Related U.S. Application Data

(63) Continuation of application No. 09/643,628, filed on Aug. 21, 2000, now Pat. No. 6,585,163.

(51) Int. Cl.⁷ .......................... G06K 19/00; G06K 7/00; G06F 17/60
(52) U.S. Cl. ...................... 235/487; 235/385; 235/435; 235/439
(58) Field of Search ............................... 235/435, 439, 235/487, 489, 385

(56) References Cited

U.S. PATENT DOCUMENTS

| | | | |
|---|---|---|---|
| 4,165,002 A | 8/1979 | Meagher | 206/459 |
| 5,085,417 A | 2/1992 | Copham | 270/1.1 |
| 5,161,829 A | 11/1992 | Detrick et al. | 283/91 |
| 5,243,394 A * | 9/1993 | Matsuno et al. | 399/2 |
| 5,717,976 A * | 2/1998 | Chowdry et al. | 399/45 |
| 5,907,144 A * | 5/1999 | Poon et al. | 235/462.08 |

(List continued on next page.)

FOREIGN PATENT DOCUMENTS

| | | |
|---|---|---|
| EP | 1 017 017 A2 | 7/2000 |
| JP | 02076796 | 3/1991 |
| JP | 09-134415 | 5/1997 |
| JP | 11-245548 | 9/1999 |
| WO | WO 00/16982 | 3/2000 |
| WO | WO 00/16983 | 3/2000 |

OTHER PUBLICATIONS

U.S. patent application Ser. No. 09/276,532, Copperman, et al., filed Mar. 25, 1999.
U.S. patent application Ser. No. 09/643,136, Meunier, et al., filed Aug. 21, 2000.
U.S. patent application Ser. No. 10/251,713, Meunier, filed Sep. 20, 2002.

*Primary Examiner*—Thien M. Le
*Assistant Examiner*—April Taylor
(74) *Attorney, Agent, or Firm*—Jeannette Walder

(57) ABSTRACT

An encoded sheet material includes a sheet of material having a first surface, a second surface disposed opposite the first surface and an edge extending between the first surface and the second surface and peripherally about the sheet of material, the edge having indicia arranged thereon to form a code uniquely identifying the sheet of material. A system for managing an encoded sheet of material, includes a code reader operative in conjunction with the encoded sheet of material for reading the code, a sheet processing apparatus for reading information from and/or writing information to at least one of the first and second surfaces, and a processor in communication with the code reader device and the sheet processing apparatus for associating the information with the read code.

6 Claims, 10 Drawing Sheets

U.S. PATENT DOCUMENTS

| | | | |
|---|---|---|---|
| 5,912,974 A | 6/1999 | Holloway et al. | 380/51 |
| 5,932,870 A | 8/1999 | Berson | 235/494 |
| 5,959,289 A * | 9/1999 | Okada et al. | 235/487 |
| 6,085,903 A | 7/2000 | Jotcham et al. | 206/459.5 |
| 6,110,864 A | 8/2000 | Lu | 503/227 |
| 6,111,953 A | 8/2000 | Walker et al. | 380/51 |
| 6,138,913 A | 10/2000 | Cyr et al. | 235/468 |
| 6,170,744 B1 | 1/2001 | Lee et al. | 235/380 |
| 6,254,002 B1 | 7/2001 | Litman | 235/450 |
| 6,266,680 B1 | 7/2001 | Song et al. | 707/500 |
| 6,330,976 B1 | 12/2001 | Dymetman et al. | 235/487 |
| 6,335,084 B1 | 1/2002 | Biegelsen et al. | 428/192 |
| 6,604,875 B2 * | 8/2003 | Meunier et al. | 400/103 |
| 6,651,975 B2 * | 11/2003 | Ohtsuka et al. | 271/145 |

* cited by examiner

FIG. 3
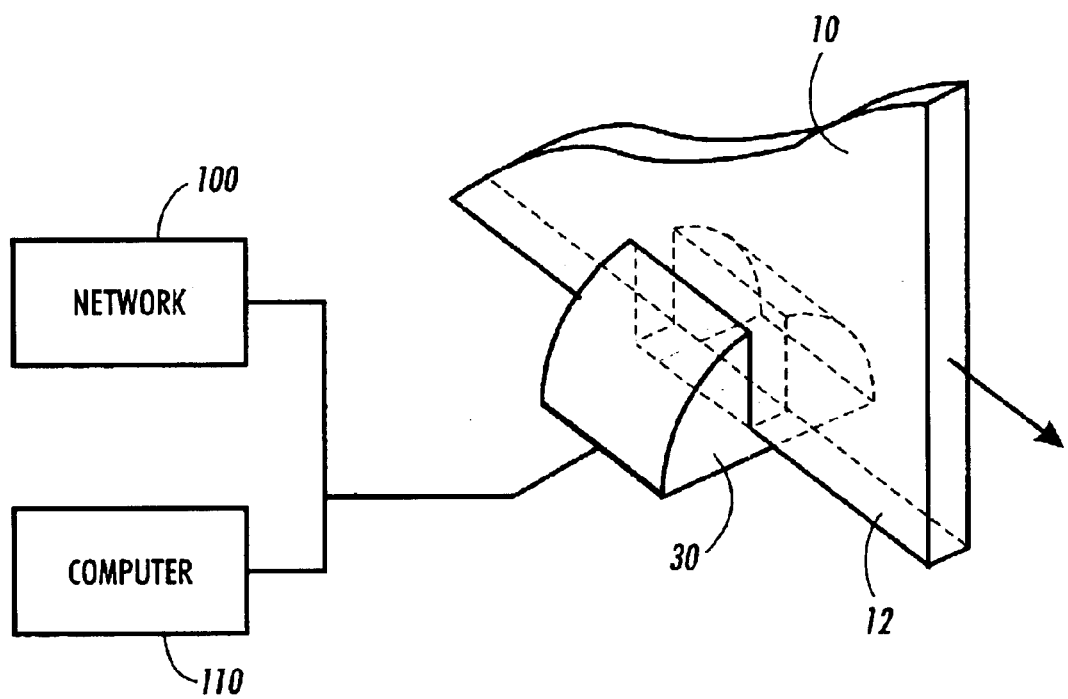
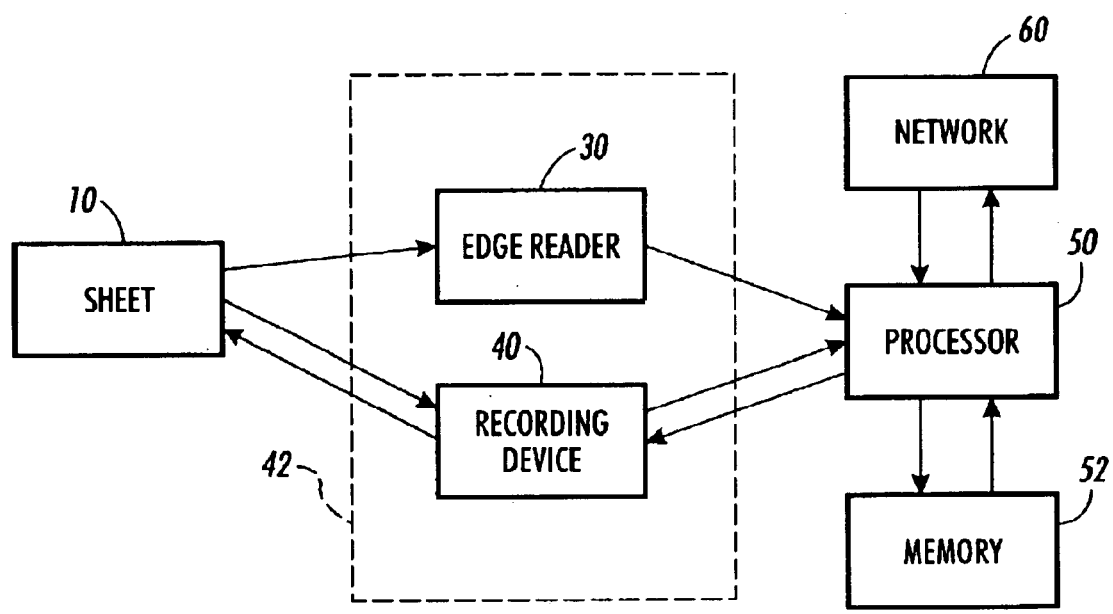
FIG. 4

*12 CHARACTERS IN CODE 39 BARCODE TYPE*

*CODE 39 BARCODE CONTAINING THE VALUE "E-PLACARD"*

ENCODED SHEET MATERIAL

CROSS REFERENCE TO RELATED APPLICATION

This application is a continuation of U.S. application Ser. No. 09/643,628 filed Aug. 21, 2000 now U.S. Pat. No. 6,585,163, the contents of which are incorporated herein by reference.

FIELD OF THE INVENTION

This invention relates generally to encoded sheet material, and more particularly to systems and methods for managing encoded sheet material having information recorded thereon.

BACKGROUND OF THE INVENTION

Despite the publicity about the paperless office, paper remains an important media in today's working environment. Many efforts have been made to integrate paper documents with computer-based information systems. These efforts generally involve two scenarios. The first scenario involves scanning an existing physical document to create a digital copy, assigning a digital file name and then managing the digital copy as any other digital file. The second scenario involves creation of a physical document from an existing digital document or file such as by printing. To aid in the integration process, a barcode or a Dataglyph may be printed or otherwise attached to a physical document. Dataglyphs are generally less visually disruptive than barcodes. Both barcodes and Dataglyphs provide a means for the computer to grasp intentionally printed information on the paper document. Since both are generally applied at the time the information is recorded on the sheet of paper (but may be applied later through the use of an adhesive label), both generally appear on the same face of the sheet of paper as the recorded information.

At the organization level, many documents, such as contracts, reports, files, technical documentation, etc., have to be physically stored for legal, administrative or operational reasons. Attention must be paid to their indexing and classification in order to keep document retrieval cost at an acceptable level. One solution is to physically attach a barcode or Dataglyph to an existing paper document and scan the document into the computer-based information system.

Having a record of a paper document in a computer-based information system does not solve the problem of knowing where the actual paper document is located. Even if location information is stored at the time the paper document is input into the system (such as when the barcode or Dataglyph is read by the computer-based information system), the paper document may have been moved when a user retrieved it and later replaced it.

Most paper documents in offices do not contain barcodes or Dataglyphs and are not part of a computer-based information system. Most offices have piles of document on shelves, desks and the like that are classified in an ad-hoc and personal manner. Finding a document in one of these ad hoc filing systems often means browsing through several piles to find a particular document.

The verification that a paper or hard copy version of a document is an original, as opposed to a copy or imitation, is important in many businesses and legal transactions. Examples include contracts, stock certificates, bank notes, premium bonds, etc. Verification of authenticity of an original document has become harder to perform since modern techniques enable the production of high quality copies which are frequently difficult to detect from the original. Even if an original paper document included a barcode or Dataglyph on the face of the document, any copy of the paper document will also include the same barcode or Dataglyph.

Much work has been done in order to verify the integrity of the content of a hardcopy document as well as its origin (this is referred to as authenticating a document). Verifying the content and origin (authenticating) of a hard-copy document consists of making sure that its content was not tampered with, and that it really originates from the supposed source. This prevents manipulation of the content of a document, while true (i.e. not manipulated) copies remain possible. Originality check is concerned with discriminating copies from the original hardcopy document. The problem of originality is closely related to the problem of authentication because in most cases where originality is important, the content is also important. However, in some cases the originality of a sheet of paper itself is important, independently of its content. Consider for instance the case of a sheet of paper being circulated to collect signatures for a petition. When it comes back, the originator expects to have the original sheet (and not a possibly manipulated copy).

The use of edge marking of sheet materials has been proposed for various applications. U.S. Pat. No. 5,085,417 to Copham, Method of Encoding Stacks of Printed Materials, describes a process for using edge markings to identify one customer's order for form checks from another customer's. During manufacture of a sheet of checks, a coded image is provided at the cutting boundaries of the stock sheets, so that when the checks are cut from the stock, an identification code appears on the checks when viewed from the edge. The edge-visible code is obtained by cutting the paper precisely where marks are located. A different code is provided for each customer to enable workers to look at the stacked check books at the edge to determine if another customer's checks were erroneously placed.

U.S. Pat. No. 6,335,084, "Encoded Sheet Material and Sheet Processing Apparatus Using Encoded Sheet Material", which is assigned to the same assignee as this application, describes pre-marking of edges of paper reams/stacks (during manufacture) with information related to the paper's physical properties (e.g., its weight, color). This encoded information is read and used by printers (and other recording devices which record information on the faces of the sheet material) when selecting paper from paper trays.

SUMMARY OF THE INVENTION

An encoded sheet material, according to the invention, includes a sheet of material having a first surface, a second surface disposed opposite the first surface and an edge extending between the first surface and the second surface and peripherally about the sheet of material, the edge having indicia arranged thereon to form a code uniquely identifying the sheet of material. A system for managing an encoded sheet of material includes a code reader operative in conjunction with an encoded sheet of material for reading an edge code; wherein the encoded sheet of material has a first surface, a second surface disposed opposite the first surface and an edge extending between the first surface and the second surface and peripherally about the sheet of material, the edge having indicia arranged thereon to form a code uniquely identifying the sheet of material; a sheet processing apparatus for reading information from and/or writing information to at least one of the first and second surfaces of the encoded sheet material; and a processor in communication with the code reader and the sheet processing apparatus for associating the information with the edge code.

By providing each sheet of material with a unique edge identifier, any information that may be recorded on the sheet of material may be associated with that sheet of material. By placing the unique identifier on the edge, both surfaces are available for recording information. The edge marking can be made with a visible or an invisible ink. If the recording device includes an edge reader coupled to a processor with a memory, whenever a user makes a copy of an electronic file, the recording device reads the edge marking on each sheet of material used, and the processor associates that sheet of material with the electronic file. This association can be stored in memory. This feature is useful for tracking or monitoring physical copies of an electronic file. Additional information or meta data may also be associated with the electronic file.

The association information may be stored and used for other purposes, such as monitoring the number of copies made of a particular file, for monitoring the location of the copies and for monitoring the number of sheets of material used. The association information can be made or updated at any time. For example, if an electronic file is printed on a sheet of material with a unique edge marking, that association may be made and stored in a memory at the time of printing or later. If that recorded sheet of material is used to make a photocopy, an edge reader in the copier can make an association of the read edge marking of the "original hard copy" with the edge marking of the sheet of material used to make the photocopy. This information may be stored in memory and can be used to update the association information with the original electronic file and create a new association for the "original hard copy."

Retrieving information associated with a sheet is accomplished by reading its edge identifier and querying the infrastructure to retrieve this information, given the identifier. Preferably, sheets of material are pre-marked at production time. If pre-marked at production time, each sheet can be given a code identifying the ream to which it belongs as well as uniquely identifying that sheet. The code can include a portion identifying the ream, manufacturer, and other information that a user might require. Some reams of sheet material may be specially coded with special visible and/or invisible inks and used as special bond paper for financial instruments, for example. Indeed, some organizations may wish to reserve special reams of material.

Edge-readers can either be embedded in the recording devices (such as printers, facsimile machines, photocopiers, shredders, etc.) or affixed in work places (e.g. desktops). The edge readers are coupled to a computer or network where the read association information may be read and/or written. The edge readers enable the automatic association of printed-sheet <-> document. Users may also use any sheet of a document either to obtain related service by passing the sheet through an edge-reader, or to establish an association in a similar way.

Documents in paper form are largely used in almost all businesses. Documents are frequently stored in an ad-hoc manner (e.g., on personal shelves in an office) or formally (e.g., legal or contractual documents are stored in filing cabinets, etc. in banks, administration offices, etc.). Document classification and retrieval is often problematic and costly. The method of the invention provides computer support to these two tasks, without disrupting the user's normal work practice, and requires less effort. The invention enables documents to be automatically indexed in place (i.e., in their normal storage area) and retrieved by obtaining storage information from a computer-based system.

The encoded sheet material of the invention may be used to index and manage physical documents. Indexing and managing physical documents generally involves four steps. First, the physical documents must be indexed, which often includes generating some form of unique identifier. Then the physical documents must be inserted in the storage area, i.e., in accordance with some classification scheme. Retrieving the stored physical document involves searching through the storage area using the classification scheme. Finally, after use, the document must be re-inserted into the storage area, which location may be different from the original location.

Physical documents may be edge marked and the edge markings used to index and retrieve them from their storage locations. A method of managing a physical document, wherein the physical document includes at least one sheet of material, includes marking an edge of the at least one sheet of material with indicia arranged to form a code identifying the sheet of material, storing the physical document in a storage location, indexing the physical document by associating the code with the storage location, and storing the indexing information in a computer-based information retrieval system. A method of retrieving a physical document stored in a storage location, includes obtaining a code associated with the physical document, wherein the physical document includes at least one sheet of material having a first surface, a second surface disposed opposite the first surface and an edge extending between the first surface and the second surface and peripherally about the sheet of material, the edge having indicia arranged thereon to form the code identifying the sheet of material, and information recorded on at least one of the first and second surfaces of at least one of the sheets of material, using a scanning device to scan the storage location for the code, and when the output of the scanning device indicates the location of the sheet of material having code, retrieving the physical document.

The invention provides a computer-implemented system for the indexing, storage and retrieval of paper document from piles, filing cabinet, shelves and more generally from document storage areas where document edges are visible. By using a robust code, such as a large barcode on the edge of the documents, which is visible (to the particular scanning device) on the edge of the documents, physical documents may be input into a computer-based system and located for retrieval. In addition to storing the edge codes and location information, images of the storage area (shelves, piles, etc.) may also be stored in the computer-based system. Documents can be located by scanning the storage location for the document's edge code or by accessing the computer-based system and retrieving the storage location.

Since each sheet of paper holds a unique identifier (preferably) pre-marked on its edge at production time, indexing is automatic; the pre-marked edge codes constitute the minimal required index. However, this does not preclude the use of other forms of indexing, in addition. Since the physical documents can be easily retrieved (by scanning stacks of files for their edge codes), storage of physical documents becomes as simple as stacking documents as they arrive. However, any other classification scheme can also be used. Documents must be stacked so that the edge codes can be read. Physical document retrieval is computer or network supported; the computer or network indicates via an output device where the document is located. For example, the computer may display an image of the storage area where the document is located. Re-insertion of a physical document is equally simple.

An original document is one from which a copy, reproduction or translation is made. In the case of a contract, the original contract is the one (or ones in the case of duplicate originals) with the original signatures affixed to it. Originality goes to a document's content as well as physical integrity (i.e., the particular sheets of paper used). Authenticity of a document goes to the integrity of the information, i.e., whether the information conforms to the information in the original. An authorized copy of an original document, is authentic if it conforms to the original so as to reproduce essential features. The invention enables the authentication of originals as well as copies. The invention provides a method of authenticating the sheets of paper (material) on which documents are recorded as well as authenticating the information on the sheets of material.

A method of creating an authenticatable sheet of material, according to the invention, includes measuring at least one physical property of the sheet of material; marking an edge of the sheet of material with indicia arranged to form a unique code identifying the sheet of material, wherein the sheet of material includes a first surface, a second surface disposed opposite the first surface and an edge extending between the first surface and the second surface and peripherally about the sheet of material; and recording the measured physical property in a measure database indexed by the edge code. To verify the validity or authenticity of a sheet of material, the edge code is read, the same physical property is measured and the measured value is compared with the previously stored value extracted from the measure database. If the two are substantially equal, the sheet of material is authentic.

The use of edge codes and physical property measures can be used to authenticate a document, i.e., a sheet of material on which information has been recorded, and verify its originality. A method of creating an authenticatable physical document which includes information recorded on a surface of the sheet of paper includes using the edge code with the information to generate an encryption hash, digitally signing the encryption hash and recording the digitally signed encryption hash on a surface of the sheet of material. If a physical property has been measured and indexed in a measure database, the originality of the sheet of material can be verified as well. A digital signature does not hide the content of the information, but is used primarily to guarantee the identification of the sender of the information and its integrity. For added security, the encryption hash may be encrypted rather than just digitally signed.

Verifying the authenticity of a sheet of material involves reading the digitally signed hash on the document, decrypting it, generating a new hash from the edge code and a portion of the information. The two encryption hashes are then compared. If they are equal, the document is authentic. Additionally, the edge code can be used to determine if the sheet of material is original, by measuring the physical property and comparing its value to the value stored in the measure database.

BRIEF DESCRIPTION OF THE DRAWINGS

FIG. 3 is a perspective diagram of an edge reader reading an edge-marked sheet of material;

FIG. 4 is a schematic of an apparatus for managing a sheet of material according to the invention;

DETAILED DESCRIPTION OF THE PREFERRED EMBODIMENTS

Figure 1:
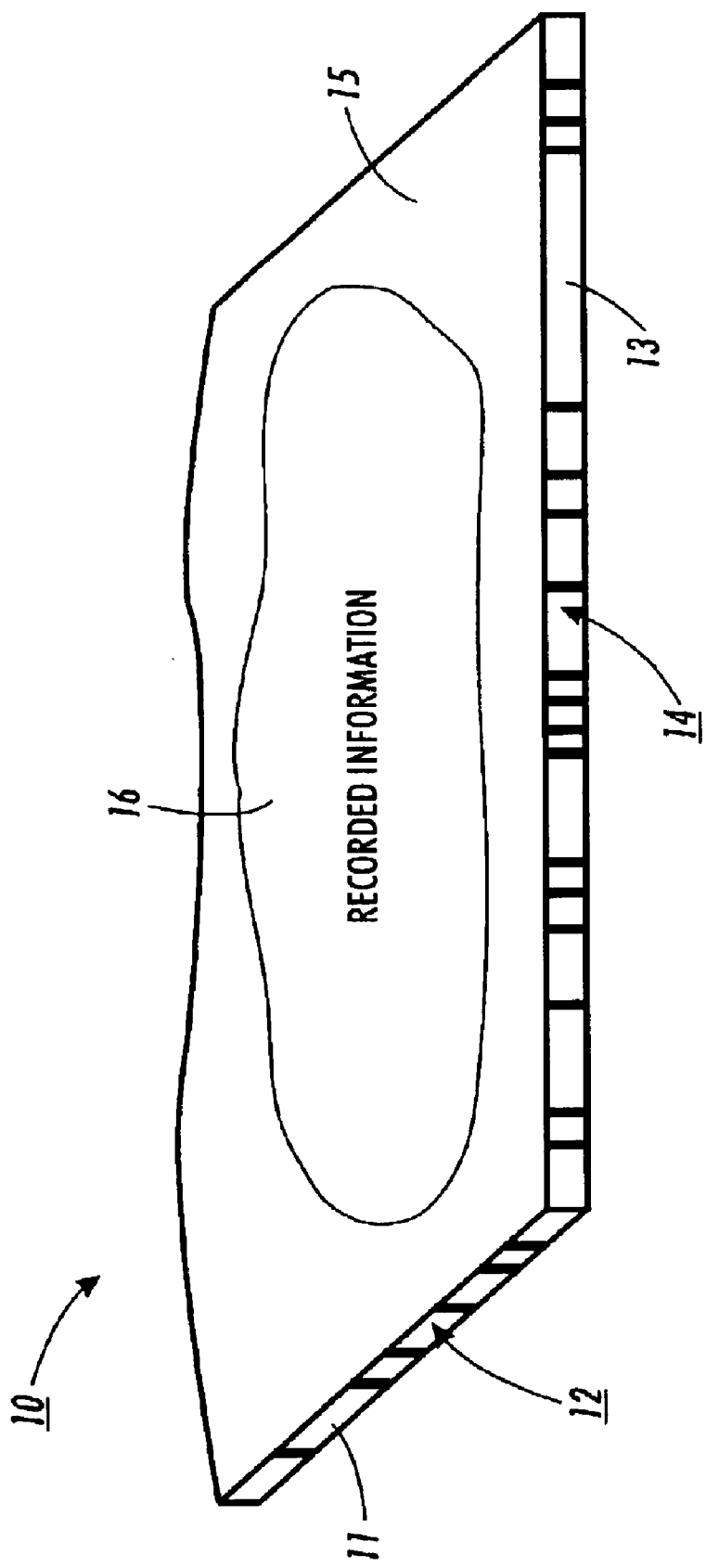
FIG. 1 is a schematic of an example edge marking according to the invention.

Most sheets of material, such as paper sheets have six faces, two of them being commonly used: the so-called recto (first surface) and verso (second surface). The four other faces, the edges, may be used to uniquely identify each sheet and, optionally, the ream it comes, manufacturer and so on. If a ream identifier is used as part of the unique sheet code, each sheet in the ream will receive the same unique ream identifier, in addition to a unique sheet identifier. These identifiers can be marked with visible or invisible ink.

Typical A4 paper sold today presents on the long and short edges a combined edge surface of $297 \times 0.1$ mm$^2$ and $210 \times 0.1$ mm$^2$, respectively. A robust code can be easily devised to fit within this size constraint. (A robust code is one which can be easily read on the edge of a single sheet of material and also affords a sufficiently large number of codes for the anticipated amount of sheets of material to be used.) For example, a 64 bit long code made of 1 mm wide bars on a 2 mm grid would require 128 mm, which leaves enough room (say 64 mm for 32 bits of error code) for error correction code. In total this code (with error correction) would require 192 mm, and would also fit on letter size sheets (8½ inches by 11 inches). A typical edge thickness of 0.1 mm is sufficient height to write the bar constituting the code. For instance, to give an order of magnitude, the dots of a 600 dpi printer are 0.04 mm high. Two of these dots fit on the edge height of 0.1 mm. Thus the edge surface of typical paper sheets is thick and long enough to hold the example robust codes. A 64 bit long code provides enough unique codes to enable each inhabitant of the earth to consume 80,000 sheets of paper (material) per day for over 100 years.

There are many schemes which may be used to create a unique code to mark the edges of sheets of material. In addition to a unique sheet identifier, the edge code may also include information identifying the manufacturer, date of manufacture, a ream identifier, etc. Two specific examples will be described herein, however, the invention is not limited to only these two. The exemplary coding schemes described below include a unique sheet identifier and a ream identifier.

The first scheme uses the long edge for the sheet identifier and the short edge for the ream identifier. Referring to FIG.

1, a sheet of material, such as paper, 10 includes long edge 13 and short edge 11. Long edge 13 includes ream identifier 14; short edge 11 includes unique sheet identifier 12. While both identifiers are shown in FIG. 1 as bars, other forms of markings may be used, such as diagonal lines, dots and the like. These marks may be visible or invisible. Optional recorded information 16 may be recorded on surface 15 of sheet 10.

Figure 2:
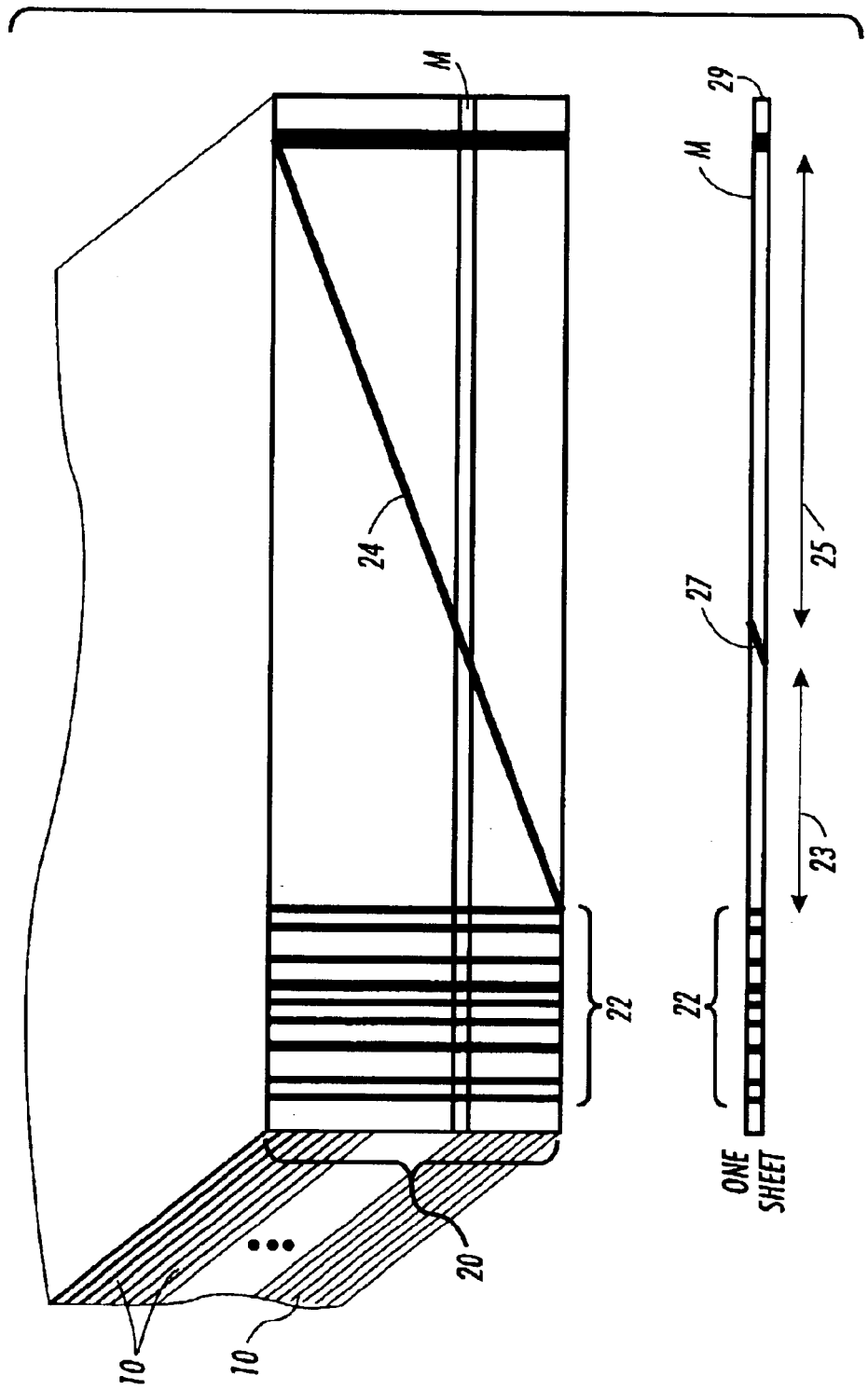
FIG. 2 is a diagram of a scheme for an edge marking including a ream marking and individual sheet marking.

The second exemplary coding scheme codes the ream and sheet identifiers on the same edge, thus allowing pre-marking of the two identifiers on all four edges, which may be advantageous for some applications. Referring to FIG. 2, ream 20 includes a plurality of individual sheets of material 10 (typically there are 500 sheets in a ream). In this coding scheme, the ream identifier and sheet identifier are on one edge. A ream identifier 22 is pre-marked at one section of the combined edges. In this embodiment, the ream identifier consists of bars. The sheet identifier is created by offset line 24, drawn across the entire ream. This marking scheme enables pre-marking of the entire ream at the same time. The offset 25 between the offset indicator mark 27 and the end of the paper edge 29 is sufficient to discriminate each sheet of a ream.

In this example, the value of unique identifier for sheet M of a ream of N sheets of material may be computed as the distance 23 or as the ratio of the distance 23 over the entire distance 23+25. This value in conjunction with the ream portion 22 provides a unique identifier for sheet M. Ream identifier 22 may also include manufacturer name, date of manufacture, type of sheet material, etc.

For a typical 20 pound ream of photocopy paper (height of 5 cm, sheet thickness of 0.1 mm, and 20 cm of the ream edge dedicated to the offset line), the offset of two consecutive sheets is 0.4 mm. In addition, drawing thicker lines parallel to the offset indicator line 24 will assist the edge reader device evaluate each sheet offset (because of the regularly distributed small plots on the edge of each sheet). Other alternatives exist, such as any asymmetric curvilinear function drawn in place of straight line 24 (provided the curve provides a unique code for each sheet).

By marking sheets of material at production time with industrial means, invisible inks, fluorescent dyes or other technical inks may be used (in addition to standard visible inks or a combination of visible and invisible inks). While it is anticipated that most sheets of material will be pre-marked, i.e., during manufacture and before an information is recorded on the surface, pre-marking is not required. Edges may be marked with a code after a sheet of material has been printed or recorded with information. Edge marking after information is recorded is useful for existing physical documents, such as reports, articles, magazines, books, etc.

An edge reader is used to read the edge code on a sheet of material or physical document. Edge readers may be employed on desktops as individual units or embedded in devices such as facsimile machines, printers, copiers, shredders, etc. An example of an edge reader is shown in FIG. 3. Other edge readers may be used, such as a video camera or light pen. Referring to FIG. 3, a sheet of material 10 with a marked edge 12 passes through edge reader 30. The edge reader 30 reads the edge code, generates an edge code read signal and sends it to computer 110 or network 100. Computer 110 or network 100 associates the edge code is associated with other information about the physical document 10, such as whatever information is recorded on a surface of sheet 10. As described below, the edge code can also be associated with storage location information of the physical document.

Manual readers may be installed in any place where they allow users to conveniently read the edge identifier of a sheet of material. Typically, such a reader is affixed on the user's desk and connected to a desktop computer. An edge reader may include digital circuitry coupled with a bar sensor in front of which the sheets are translated (either manually by the user, or automatically when embedded in another device). The bar sensor may be an LED and sensor couple, without any mechanical parts. The digital circuitry decodes the edge-printed identifier, possibly in reverse direction because of possible rotations of the sheet of paper.

Referring to FIG. 4, a system for managing a sheet of material is shown. Sheet of material 10 is pre-marked during manufacture with a unique code on an edge. Sheet 10 is provided to edge reader 30 which reads its code and provides it to processor 50. Sheet 10 may also be provided to sheet processing apparatus 40 which may be a printer, which will print information from a digital file onto a surface of sheet 10 or a scanning device which will read recorded information from a surface of sheet 10 and create a digital file from it. Edge reader 30 and recording device 40 may be separate devices or edge reader may be embedded in recording device 42. Recording device 40 reads or writes recorded information to processor 50. Processor 50 associates the read edge code with the recorded information and stores the association in memory 52. Alternatively, processor 50 may store the association information on a network 60. Each time the sheet 10 is processed by edge reader 30 and/or recording device 40, the association information may be updated.

In addition to creating associations between sheets of material and digital files, associations may be retrieved using the method and system of the invention. If a physical document includes at least one sheet of material with an edge code (and presumably recorded information on at least one of the sheets), the sheet of material may be read by an edge reader coupled to an information retrieval system. If the read edge code has been previously associated with some information, that information will be retrieved by sending the sheet of paper through an edge reader and searching for any stored associations with that edge identifier.

Various infrastructures may be used to associate a sheet of material with an edge code identifier with some information, and to retrieve the latter given an identifier. In particular the infrastructure disclosed in co-pending, co-assigned U.S. Pat. No. 6,330,976, "Marking Medium Area with Encoded Identifier for Producing Action through Network" and U.S. application Ser. No. 09/276,532 filed Mar. 25, 1999, "Obtaining Network Addresses from Identifiers" may be used. These applications describe how a coded number is resolved to the Internet address of a document (or action) through indirection via a centralized router and devises efficient routing schemes (which allow codes of the order of 64 bits). Because of the indirection level provided by the router, paper can be sold with the code pre-marked on their edges; association with an existing reference may be done a posteriori through a software process of linking the code to the document address in the routing tables.

Because of the important role of paper in workplaces, the ability to easily associate any piece of paper with electronic information is an essential feature for creating and developing knowledge sharing solutions. For example pre-marking of unique identifiers on paper sheets makes it possible to turn any page of a user's documents into a document token. There is no need to print additional machine-readable code, since the sheets are pre-marked, but only to associate the pre-marked identifiers with the electronic document, or with whatever is needed for further usage as document token.

For example, if sheet processing devices which output printed paper (printer, fax, copier) are equipped with an edge reader and connected to the infrastructure of the above described co-assigned applications, it is possible to associate every printed sheet with application-relevant information. For example, a printer associates the produced document with some electronic information, by associating (the range of) the identifiers of the constituting sheets with it. Optionally, only the first and last sheets are pre-marked sheets in order to reduce the visual "gray" effect on the edge of printed document (two different paper stacks may be used, one with pre-marked paper and the other with normal paper). The copier associates the identifier of the original paper to its copy's identifier, or possibly resolves the former before establishing the association. A facsimile machine works similar to the printer. In turn, the printed document is known to the system and any of its sheets can act as a document token once passed in an edge reader.

Thus a reprint may be obtained by reading the edge of a document sheet at a "reprint" edge reader affixed close to a printer or copier. The electronic version of a document may be opened on a computer by passing the printed version in the desktop edge reader.

Uniquely identified sheets may be used in conjunction with the system described in U.S. Pat. No. 6,330,976 dealing with the recognition of the document the person is using. By combining the two, "Intelligent Papers" may be easily produced. Either the publisher prints the document on an edge-reader-equipped printer to establish the association between the paper document and its electronic counterpart, or it associates the document with the pre-printed ream identifier(s). The latter applies particularly well for large volume as it avoids reading each sheet identifier when printing and as it reduces the infrastructure load for association and resolution. The device used by the user must be equipped with an edge reader in order to identify the electronic counterpart of the document (by querying the normal Intelligent Paper infrastructure).

Figure 5:
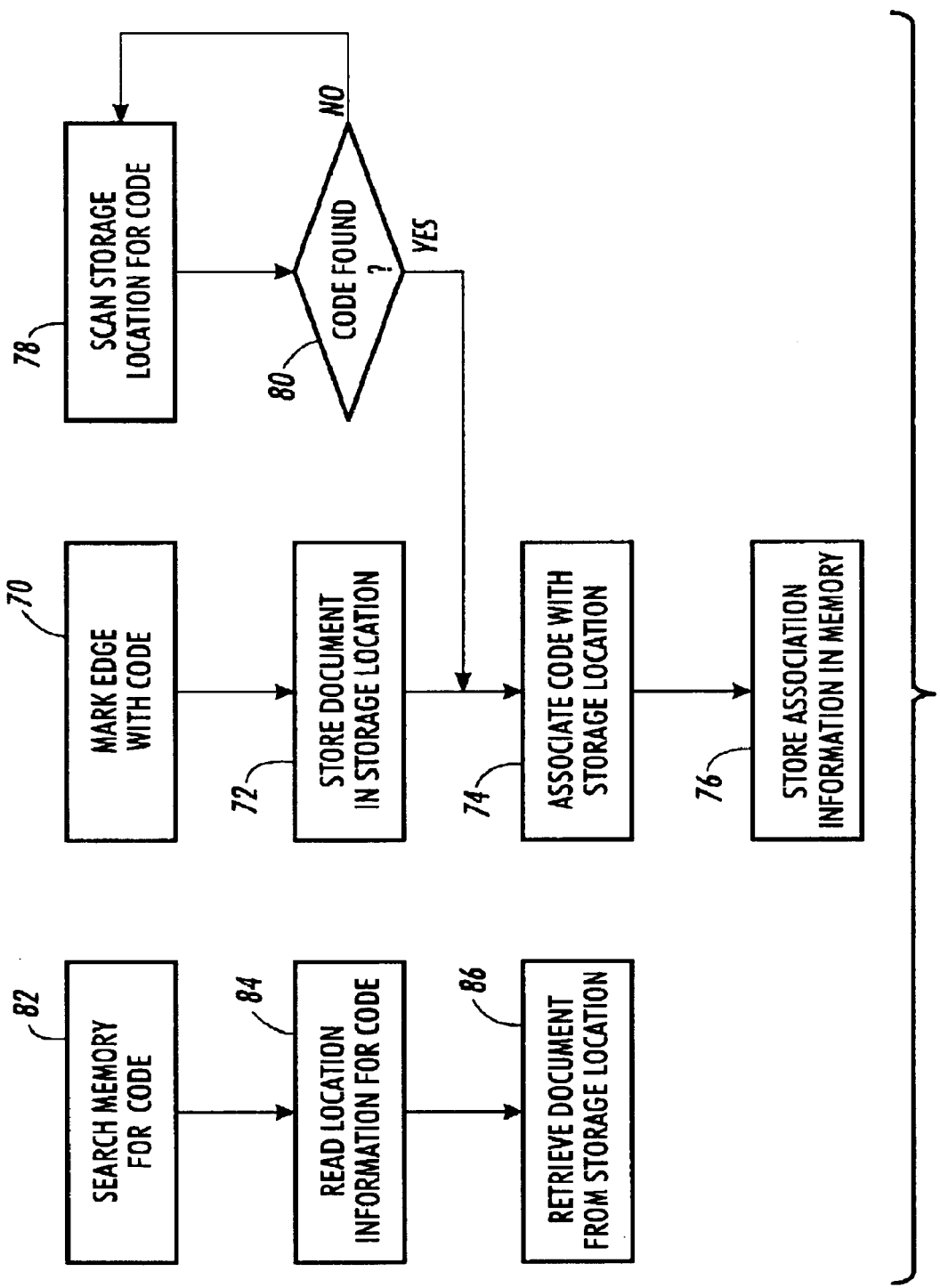
FIG. 5 is a flow chart of a method of indexing and retrieving physical documents according to the invention.

Visible edge codes can be used to index, store and retrieve physical documents. A visible code may be one that is visible to the eye, and it may also be one that is invisible to the eye and visible to a detector, such as an infrared detector. A flow chart of the various steps in the method is shown in FIG. 5. The first step is to mark the edge of at least one sheet of a physical document (step 70). Preferably this is accomplished during manufacture of the sheet of material (such as paper), but it may also occur after manufacture. For multi-page documents, one or some or all of the individual sheets may be edge marked with an identifying code. The code is associated with the physical document, such as by document meta data (e.g., URL, title, author, type, topic, date, file name, or some other convenient reference that may be user selected). Associating the code with the physical document ties the content of the document to the sheets of material.

In step 72 the physical document is stored in the desired physical storage location (e.g., pile of documents on a desk, file drawer, room, etc.). In step 74 the code is associated with the actual location in storage of the physical document. In step 76, the location association information is stored in a memory. The association information includes document code and location information. It may also include the meta data previously associated with the code. An image of the storage location where the physical document is located may also be associated with the code.

If a document is already in a storage location and it has an edge code, but it has not been indexed into the system, it can be indexed by scanning the storage location for the document's code (step 78). When the code is located (step 80), the storage location is associated with the code (step 74) and that information is stored in memory (step 76).

Retrieving a document indexed in the system is accomplished by searching the system's memory for the document's code (step 82), reading the location information associated with the code (step 84) and then retrieving the document from the storage location (step 86).

There are several ways to make visible a code on the document edge and to establish the association between the edge-visible code and a document. Preferably, the edge of paper sheets is pre-marked at production time with a code uniquely identifying each sheet and each ream of paper; a software infrastructure that permits associating the edge code with some data relevant to the document (usually the identity—such as the URL of the document—but possibly also with meta data) is provided and edge-reader are provided both embedded in devices like printers and copiers and provided to users as a desktop tool.

The edge marking scheme shown in FIG. 2 may be used. Since most documents will contain several pages, we are interested in the visual effect of stacking the sheets of a document, where the ream identifiers and offset indicators become aggregated. It is reasonable to assume that in most cases, most of the sheets of a document come from the same ream. Because several sheets of the printed document have the same ream identifier, this identifier will become clearly visible on the document edge. In a similar manner, the document edge will exhibit a portion of the offset indicator line, as shown in FIG. 2.

The combination of the aggregated ream identifier and offset line portion uniquely identify the document. Note that these marks may be invisible to the human eye because they are marked with invisible ink, or semi-visible. In some situations it may not be necessary to read the entire code on each sheet of paper. A simplification of the method may be made by using only the ream identifier. The retrieval service may be slightly degraded; the computer system may indicate several locations for the requested document, corresponding to the several documents printed from the same ream. An advantage of this simplified version resides in easier image processing, in particular if only the ream identifier is written on the short edge of sheet and is therefore very large. This simplified version may fit well in office settings, where several users share a printer and there is little chance the same user will obtain several documents from the same ream.

In addition to the edge marking described above, other methods of marking edges of sheets of paper may also be used in the indexing, storage and retrieval method.

Once a code is provided on the edge of at least one sheet of the document, the code may be associated with the document or the document meta data in one of several ways. Preferably, the association is established at print time in an automatic manner as described above. The printer is equipped with an edge reader, which decodes the unique sheet identifier, and establishes the association between the document and the sheet identifier. For the association, the infrastructure described in co-assigned U.S. Pat. No. 6,330, 976 and patent application Ser. No. 09/276,532 may be used.

Very little modification is required to implement this system; the printer must have an edge reader embedded or coupled to it. Paper surfaces are free from any mark and can be imprinted with any content. Alternatively, the user may explicitly establish the association once the document is printed, by presenting it to a sensor (edge reader, camera, scanner).

Location information can be stored as an image with the document association information. A camera can be used to obtain an image of the document in the storage area. The image can be grabbed either on demand (when a search occurs) or periodically to maintain an up-to-date index of location of documents. The latter also permits reporting on document availability and in some way tracking document usage. An inventory of stored documents is also available to the user.

Because of resolution issues, one image may not be adequate to identify and read edge codes. Obtaining a higher-resolution image of the storage area, in particular for large areas, is possible, for example, by overlapping snapshots. If overlapping snapshots is insufficient to locate a document, image mosaicking may be used, but is computationally more costly (in order to stitch together slightly high-resolution overlapping snapshots). Once the computer has determined the location of a searched document, the location may be communicated to the user by displaying n image of the storage area, for instance, with the exact location of the document highlighted in the image. This provides a natural and intuitive way of communicating location to users.

In addition to cameras, a laser detector coupled with a laser beam may be used to point out the document to the user. A more futuristic approach would be for the user to wear a computer equipped with a camera, and to have a glass-mounted screen. Augmented reality techniques would then allow the user to directly see where the document is within the storage area.

Figure 6:
FIG. 6 is an example of 12 characters in Code 39 barcode.

The identification of regions holding a code and its decoding requires image-processing techniques. In order for these techniques to work, the code must have sufficient resolution. While many different codes may be used and have the required resolution depending on the image processing equipment used, we have demonstrated the feasibility of a widely used barcode named Code 39. Encoding codes of the order of $2^{64}$ bits requires 12 characters, given the alphabet of 42 symbols of the Code 39. Each character encoded in a Code 39 symbol is made up of 5 bars and 4 spaces for a total of 9 elements. Each bar or space is either "wide" or "narrow" and 3 out of the 9 elements in any given character are wide, giving the code its other name—Code 3 of 9. Consider narrow bars of 1.25 mm and wide bars of 2.5 mm. The 12-character code has a total length of 196 mm, and fits on the short edge of a sheet (see FIG. 6). For the long edge, much thinner bars can be used to preserve room for the offset indicator line. For example, using more classical 0.25 mm width bars makes the code length back to 4 cm.

Consider now that a camera with a 1600×1200 pixels resolution grabs one picture of an area of 1 meter×0.75 meters]. Each pixel represents 0.625 millimeters×0.62 millimeters. Two pixels cover the width of one narrow bar. Four pixels cover the width of a wide bar. This fits our needs, while not taking into account higher resolution obtained via image mosaicking. There may be a problem for documents that do not exhibit a clear image on their edge, e.g. there is no block of contiguous pages coming from a single ream that is large enough to form an image. This can happen for a very small document, or for a document spanning over several reams. The case of paper jam may also slightly trouble the image of the offset line, although probably not seriously. All of these problems can be handled in two complementary ways. First, the printer can detect these problems when they occur, because it reads the edge identifier of each sheet. Once a serious problem is detected, it can notify the user and print the document again if the problem was transient (paper jam, several reams). Small documents may possibly not work at all, unless additional blank pages (or some special separators) are added to them. Second, the user can detect these problems simply by looking at the edge of the document (if ink is visible or semi-visible).

Figure 7:
FIG. 7 is an example of the code "E-PLACARD" in Code 39 barcode.
Figure 8:
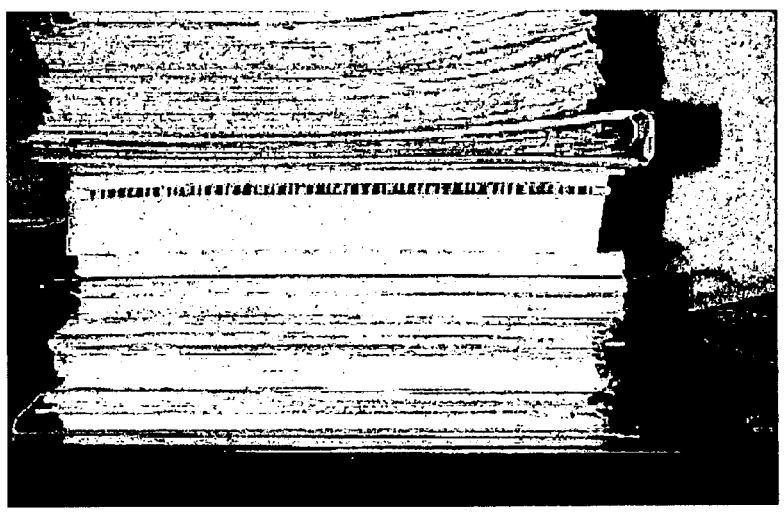
FIG. 8 is a photograph of a 30-page document with the code of FIG. 7.
Figure 9:
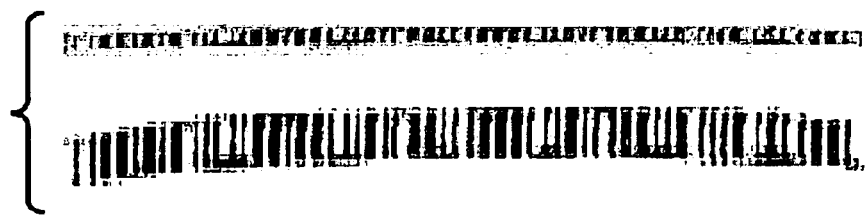
FIG. 9 is a photograph of the barcode extracted from FIG. 8 and enlarged vertically.
Figure 10:
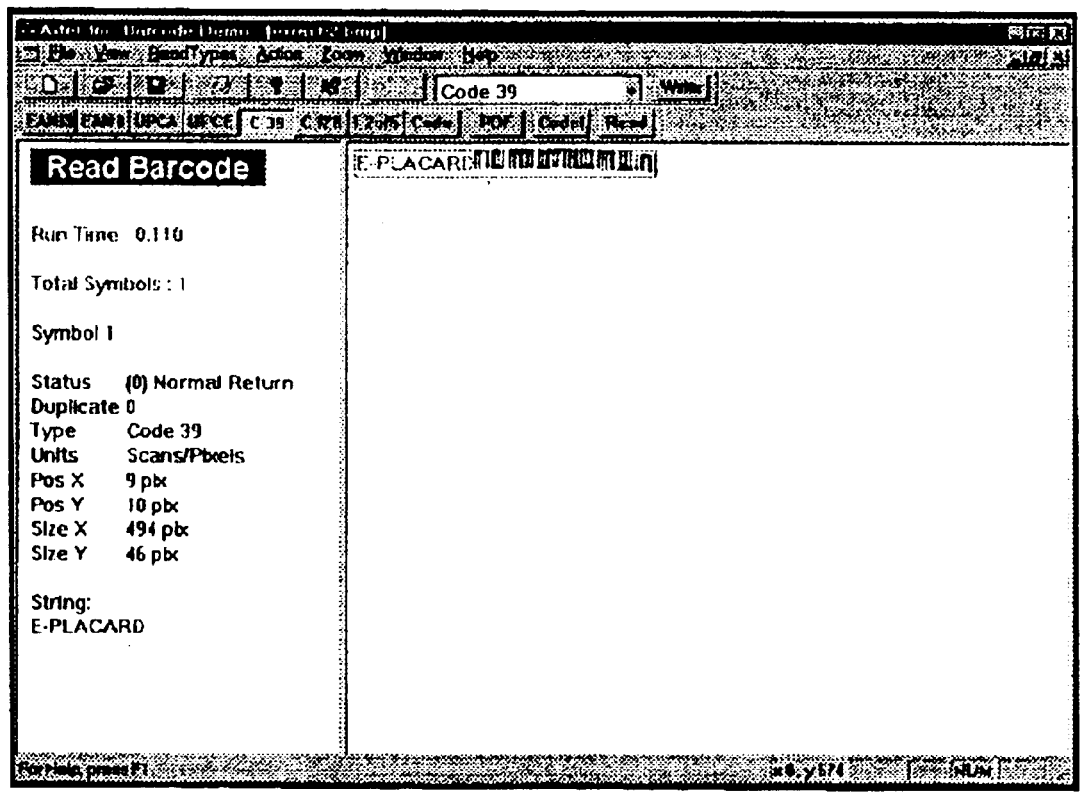
FIG. 10 is a photograph of a screen showing the results of a standard barcode reader reading the barcode in FIG. 8.
Figure 11:
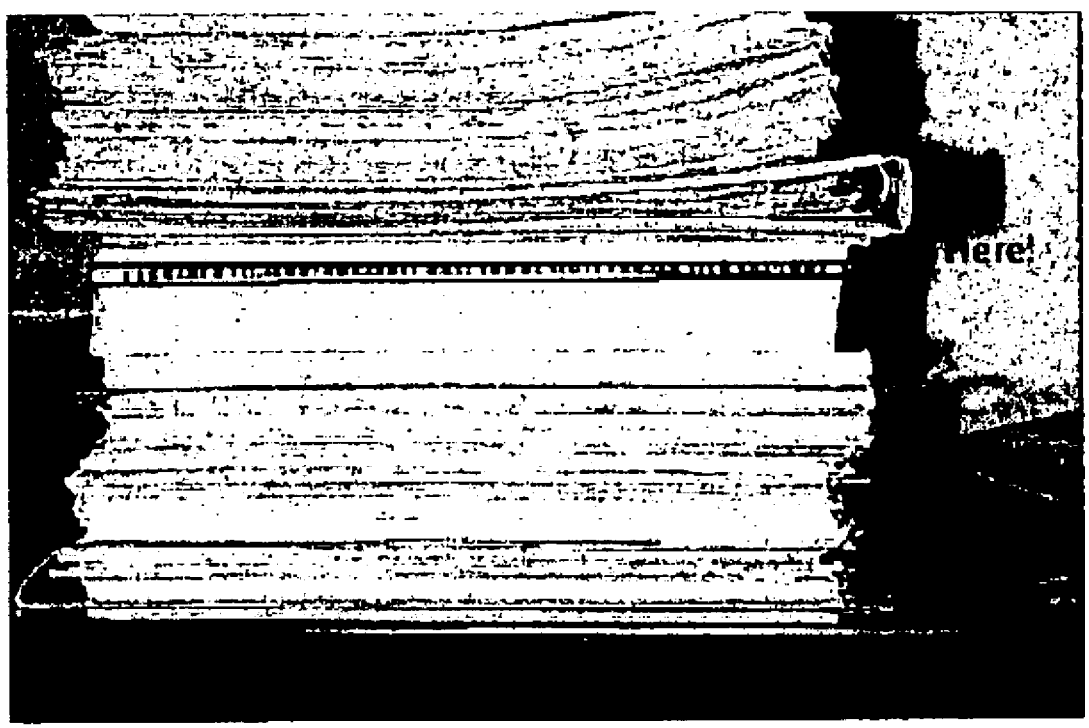
FIG. 11 is a photograph of an image of the location of the E-PLACARD document.

To demonstrate the method of the invention, a 30-page document edge marked on the bottom (short edge) of each page the barcode shown in FIG. 7. The barcode was printed at the bottom of each page using Microsoft Word with a zero width margin on a Xerox DocuPrint 4517. The barcode is actually at the bottom of the page, bleeding over onto the edge. When the 30-page document is stacked in with a group of unmarked documents, the stacked, the document edge appears as shown in FIG. 8. FIG. 8 is a photograph of the document taken with a Kodak digital camera DC50 at a resolution of 756×504 pixels. The picture covers approximately 30 cm×20 cm. FIG. 9 is a photograph of the barcode extracted from FIG. 8 and enlarged vertically. A standard barcode reader was able to read the encoded value: E-PLACARD (see FIG. 10). When queried for the location of the document encoded E-PLACARD, the system returns the image shown in FIG. 11 with stored association information.

A method of creating an authenticatable sheet of material includes using the sheets of material with unique edge codes described above. For each uniquely identified sheet of material, such as paper, the measure of some physical property is taken, preferably at production time (the measure could be taken any time before the sheet of material is to be recorded with information). The measure is recorded in a measure database indexed by the edge code (sheet identifier) of the sheet of material. The proof of originality of an individual sheet of paper is established by measuring again the same physical property and by comparing the measure to the original one obtained from the measure database. The unique identifier (edge code) of each sheet of material permits retrieval of the original measure (taken at production time or some previous time) from the database).

One or more physical properties may be measured and the measured value stored in the measure database. For paper materials, paper fiber arrangement or ink penetration may be measured. The infrastructure for associating information with a sheet of material described above may be used to associate the measured physical properties with the sheet of material's edge code. The physical property information may also be associated with any physical document (in which information such as article title, file name, URL, etc. is also stored). For security reasons, the physical property information may be password protected or otherwise securely protected.

Having a measure database for storage of measured physical property may be preferred by some users. Others may wish to store the measured physical property values locally in their own database where other association information is stored with the edge code. Still other users may wish to have the measured physical property information encrypted and recorded or marked on the edge. An edge reader when reading the encrypted edge code would have to send the read encrypted portion to a decryption device or ignore it if physical property data is not needed.

In a typical hard copy authentication process, a hash-value is created on the basis of the document content, for example, by scanning it, extracting text and picture characteristics and compressing this information (with loss) into a hash-value. The hash-value is digitally signed (it may also be encrypted if the content is to be hidden) and printed on the document itself, for example, using a private cryptographic key to sign the hash-value and printing it as a Dataglyph or barcode on the bottom of the document. Authentication consists of taking the Dataglyph marked document, computing the hash-value given the text of the document, reading the signed hash-value printed on the document, and validating it against the computed one using the public cryptographic key.

Figure 12:
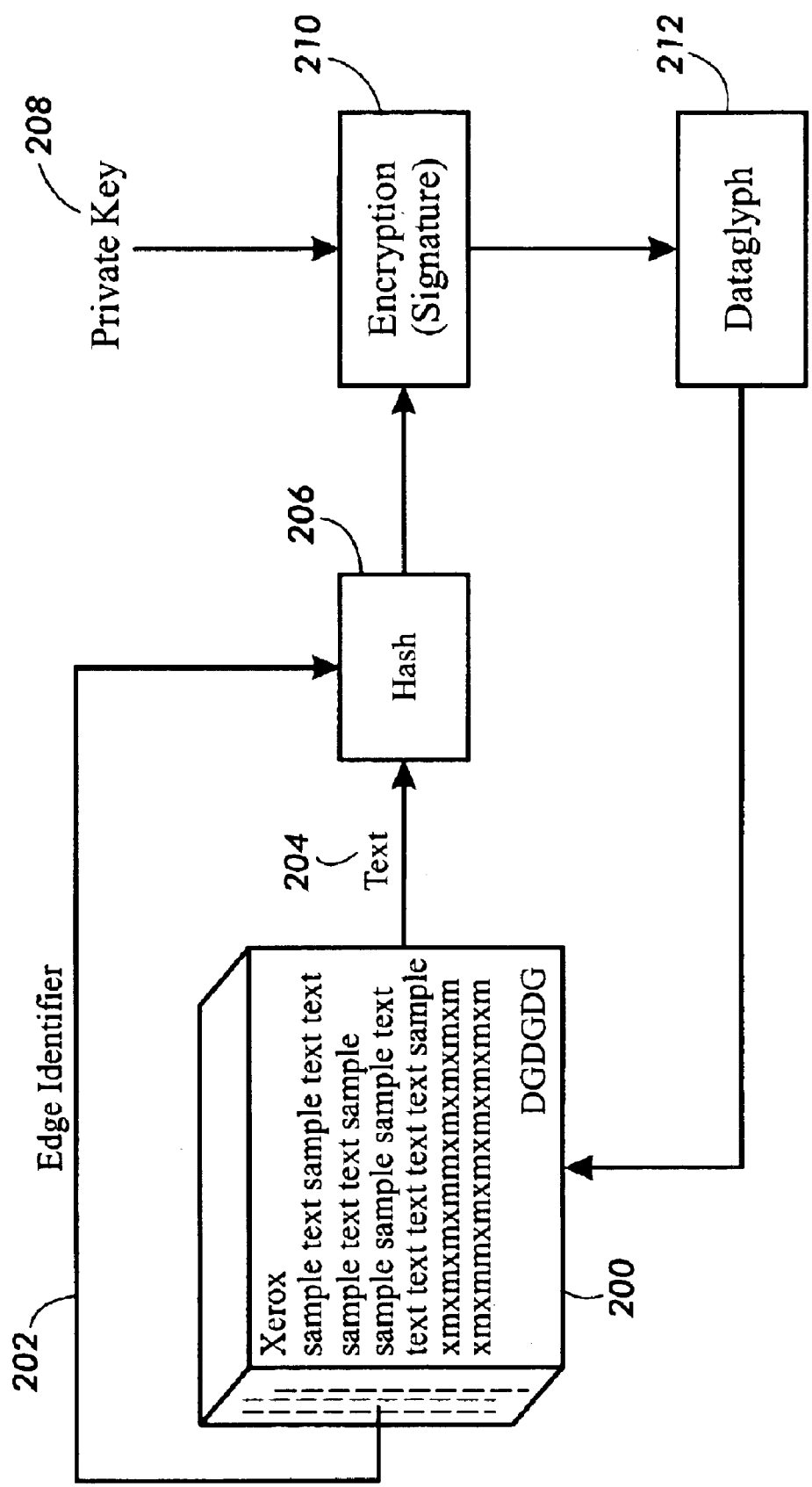
FIG. 12 is a schematic of a method of creating an authentic physical document.

The invention can also be used to extend existing hardcopy document authentication methods by inserting the unique edge code of the particular sheet of material in the document's authentication stamp. Referring to FIG. 12, document 200 includes document text 204 which is printed on the surface of a sheet of paper which has been edged marked with edge code 202. An encryption hash 206 is created using both edge code 202 and a portion of text 204. The hash 206 is then digitally signed (or optionally encrypted) 210 using private key 208. The digitally signed (or encrypted) hash is then printed as a Dataglyph 212 on document 200. Preferably the digitally signed (or encrypted) hash is printed as a Dataglyph, but any other recording method or format, such as a barcode, may be used. The Dataglyph may be recorded on any portion of the sheet of material: first or second surface or on an unused portion of the edge.

By using edge coded sheets of material that have been additionally pre-notarized, i.e., the validity of the identifier of an individual sheet can be verified by reference to a measure database, retrieving the pre-measured physical property and comparing it to the measured value, pre-notarized paper prevents a forger from producing a sheet of paper with a duplicate edge code. A forger may still damage the edge code, rendering authenticity and originality in question. Pre-notarized paper tackles the problem of originality, by ensuring the originality of the medium, i.e., a sheet of paper, given its unique edge code identifier.

Figure 13:
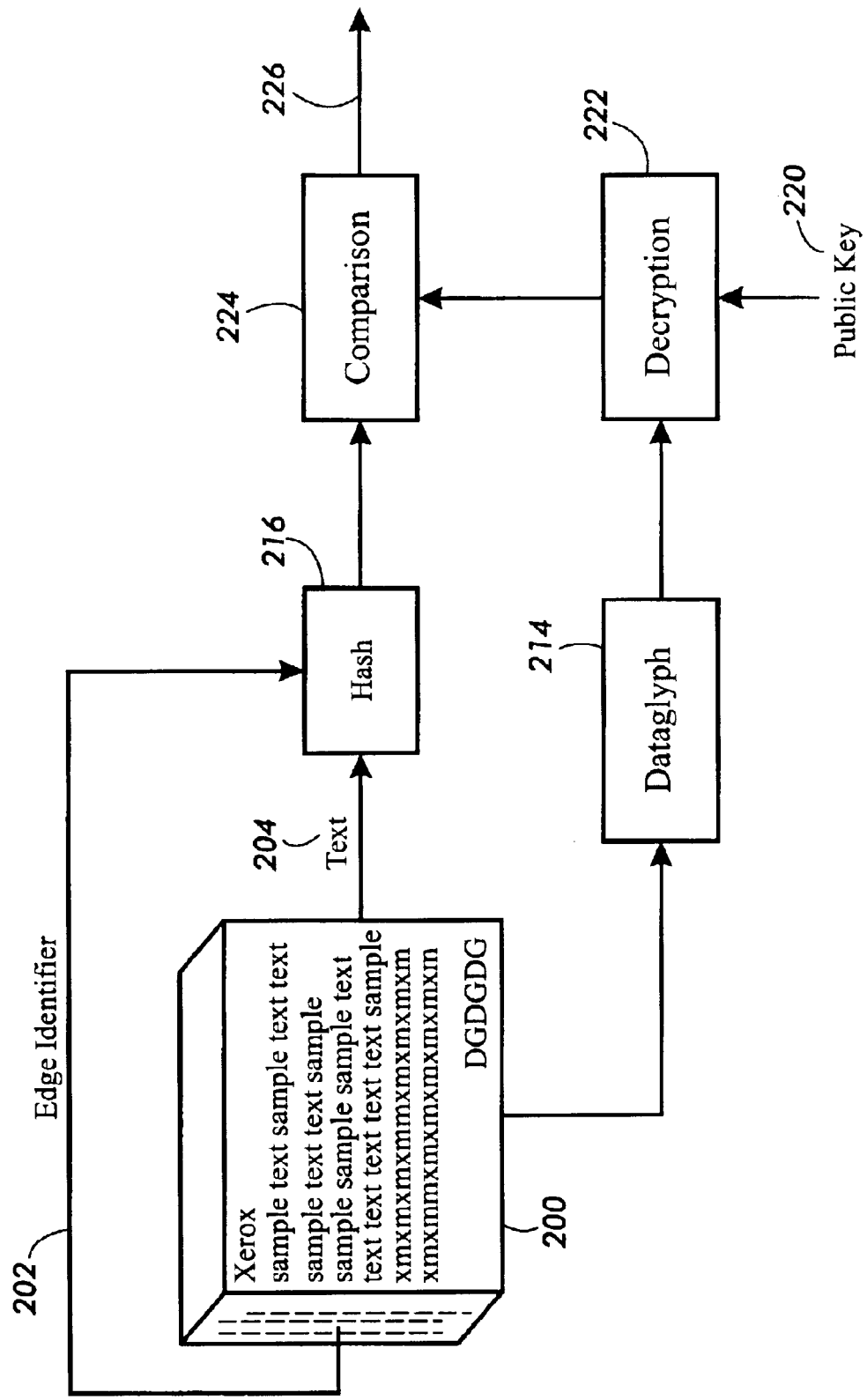
FIG. 13 is a schematic of a method of authenticating a physical document.

Referring to FIG. 13, document 200 includes edge code 202, text 204 and Dataglyph 214 which holds a signed hash-value for the purpose of authentication and originality verification. Document 200 was created using pre-notarized paper, i.e., text 204 was printed or recorded on a sheet of pre-notarized paper. In this example, pre-notarized paper was produced as follows during manufacture of the sheet of paper. The unique sheet identifier 202 was applied to the paper's edge. Some measure of some chosen physical property(ies) of the sheet of paper was taken. This taken measure was stored in a measure database and indexed by the sheet unique identifier 202.

In FIG. 13, the process for authenticating the document 200, i.e., whether the text is authentic, is shown. The edge code 202 is read in an edge reader and used with a portion of text 204 to create a new hash value 216. Dataglyph 214 is read and decrypted using public key 220 in decryption engine 222 to generate the original hash value. The original hash value is compared in comparator 224 with the new hash value 216. If the result 226 of the comparison indicates the two are substantially equal (within the level of loss tolerated by the encryption algorithm), the content (text) of the document 200 is authentic.

Figure 14:
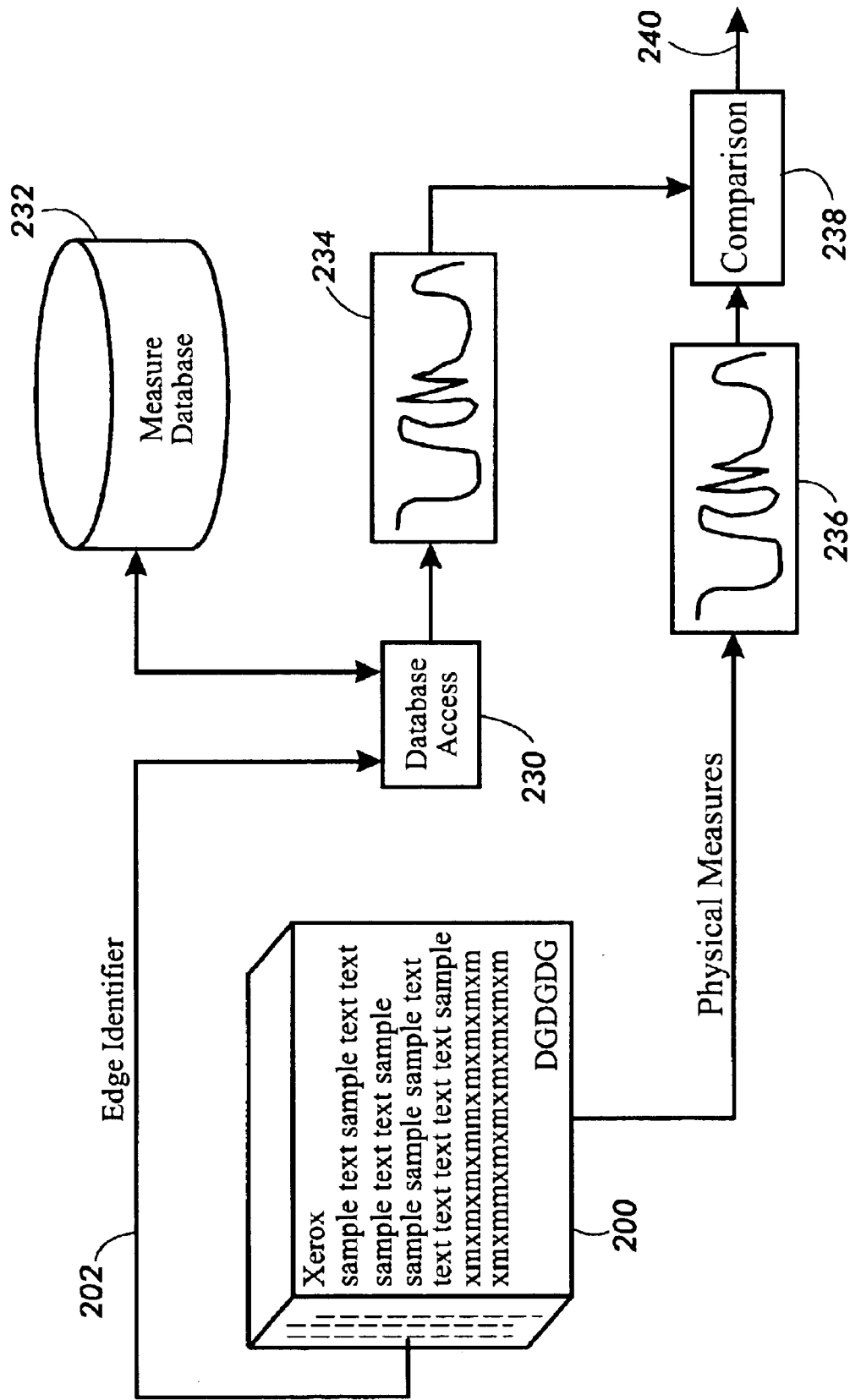
FIG. 14 is a schematic of a method of authenticating a sheet of material.

The next step is to verify that the document is original, i.e., that the sheet of paper is the same one used when the document 200 was created. Referring to FIG. 14, the edge code 202 is read by an edge reader. The edge code 202 is provided to a database access 230 which consults measure database 232. Measure database retrieves the physical properties measured 234 for that sheet of material indexed by the edge code 202. Given the type of physical properties measured at production time, those same measurements are made again to produce physical measures 236. Measures 234 and 236 are compared in comparator 238. If the result 240 is substantially equal, the paper is original.

This solution to the joint-problem of authentication and originality of hardcopy or physical documents incorporates the unique edge code identifier of the sheet in the authentication, content-based, hash-value. The verification consists of reading the edge identifier, computing again the hash-value given the identifier and the document content, and finally validating the computed hash-value against the printed hash-value using the cryptographic public key. This method prevents manipulation of the content and prevents copy of the document because the sheet identifier cannot be forged.

The strength of this method relies on the difficulty of producing a sheet of paper having both a given identifier and some given physical properties. With respect to the physical measure, the edge itself may be used as the physical property or characteristic that discriminates each individual sheet. For example, the edge mark (identifier) applied on the edge involves applying some type of ink or dye on the edge. The way the ink or dye penetrates the paper edge is presumably difficult to forge and can therefore be a valuable measure. Alternatively, the state of the "surface" of the edge and its geometry constitutes a unique profile. An advantage to using the physical characteristics of the edge comes from the imposed usage of an edge reader (to read the edge unique identifier) at various steps of the method. If some of these edge readers are also able to adequately measure the characteristics above, they will serve two purposes in one operation, both for the paper producer and for the consumer.

There are many schemes for managing the measure database. The database may be managed by the paper producer that provides a service allowing the consumers to check the validity of the sheet identifiers. The database may be managed by a notarial service run by a third party. The consumer may purchase the pre-notarized paper together with the record of the physical measures. However, in this case, the notarization may probably be valid only internally to the customer organization.

The initial physical measures can be entirely recorded, for example, as a compressed very high-resolution picture of the pre-marked edge. The comparison of the physical measures is then possibly made on the entire measure, i.e., on the entire edge and not just a portion. The level of comparison may be user defined. For example, the consumer may make measures that are less accurate than the ones taken at production time while still being able to compare the two. This has a positive implication in term of cost for the consumer (cheaper machinery, faster to operate). The invention separates the originality of the medium from the authentication of the content.

The digital signature can include the unique identifier and content-based information, regardless of the size and type of physical measures. This leads to either a smaller footprint of the digital signature or an increased accuracy for the content representation (e.g. a bigger hash-value of the text). Quick and cheap verifications of the originality can be made by reading the sheet unique identifier and checking it together with the document content against the signed hash-value (without taking any physical measure). The strength of the originality verification is directly dependent on the difficulty for a forger to mark a given identifier on the edge of a sheet of paper. However, if special ink may be used, it may require an uncommon infrastructure and know-how. Similarly, a consumer might avoid verifying the originality of the sheet (avoid taking any physical measure) when computing the hash-value for a document, to make it easier and cheaper. The paper producer may keep secret some of the measures taken as an additional protection against forgery of the paper. But some of the properties should be public, to allow the consumers to run their own verification with their own devices if they want to do so. The choice of the physical properties to measure can evolve over time almost transparently for consumers, while increasing quality of paper pre-notarization.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. An encoded sheet material, comprising:

a sheet of material having a first surface, a second surface disposed opposite the first surface and an edge extending between the first surface and the second surface and peripherally about the sheet of material, the edge having unique indicia arranged thereon to form a unique code uniquely identifying the sheet of material, wherein the indicia are pre-marked during fabrication of the sheet material.

2. The encoded sheet material of claim 1, wherein the code is 64 bits long.

3. The encoded sheet material of claim 1, wherein the code is visible.

4. The encoded sheet material of claim 1, wherein the code is invisible.

5. An encoded sheet material, comprising:

a sheet of material having a first surface, a second surface disposed opposite the first surface and an edge extending between the first surface and the second surface and peripherally about the sheet of material, the edge having unique indicia arranged thereon to form a unique code uniquely identifying the sheet of material, wherein the indicia are marked on the edge after information is recorded on one of the first and second surfaces.

6. An encoded sheet material, comprising:

a sheet of material having a first surface, a second surface disposed opposite the first surface and an edge extending between the first surface and the second surface and peripherally about the sheet of material, the edge having unique indicia arranged thereon to form a unique code uniquely identifying the sheet of material, wherein the indicia are readable by a scanner device operably connected to, and in conjunction with, a computer-implemented processor,and wherein information is recorded on one of the first and second surfaces.

* * * * *